United States Patent
Wan et al.

(10) Patent No.: US 7,155,122 B2
(45) Date of Patent: *Dec. 26, 2006

(54) CHANNEL IDENTIFICATION IN COMMUNICATIONS NETWORKS

(75) Inventors: Ping Wai Wan, Ottawa (CA); Derrick Remedios, Ottawa (CA); Dongxing Jin, Ottawa (CA); Patrick Chilufya Chimfwembe, Ottawa (CA)

(73) Assignee: Tropic Networks Inc., Kanata (CA)

( * ) Notice: Subject to any disclaimer, the term of this patent is extended or adjusted under 35 U.S.C. 154(b) by 806 days.

This patent is subject to a terminal disclaimer.

(21) Appl. No.: 10/263,959

(22) Filed: Oct. 4, 2002

(65) Prior Publication Data

US 2003/0067651 A1    Apr. 10, 2003

Related U.S. Application Data

(63) Continuation-in-part of application No. 10/067,748, filed on Feb. 8, 2002.

(30) Foreign Application Priority Data

Oct. 5, 2001    (CA) .................................... 2358382

(51) Int. Cl.
     *H04B 10/08*      (2006.01)

(52) U.S. Cl. ........................ 398/32; 398/186; 398/183; 398/34

(58) Field of Classification Search ................ 398/186, 398/183, 34, 32, 91; 370/307; 375/335
See application file for complete search history.

(56) References Cited

U.S. PATENT DOCUMENTS 4,747,095 A * 5/1988 Crookshanks ............... 370/307
5,216,417 A * 6/1993 Honda ......................... 345/89

(Continued)

FOREIGN PATENT DOCUMENTS

WO    WO 99/33200      7/1999

OTHER PUBLICATIONS

Hill, G.R., et al, "A Transport Network Layer Based on Optical Network Elements", Journal of Lightwave Technology, IEEE, New York, USA, vol. II, No. 5/6, May 1, 1993, pp. 667-676.*

(Continued)

*Primary Examiner*—David C. Payne
(74) *Attorney, Agent, or Firm*—Victoria Donnelly (57) ABSTRACT

Channels in an optical WDM network are each identified by at least two dither tones with which the channel is modulated, the dither tones alternating with a predetermined periodicity so that at any instant each channel is modulated by only one dither tone. The dither tones are continuously generated at precise frequencies. Channel detection by detecting the dither tones, for channels having optical powers over a wide dynamic range, makes use of an FFT process which can detect dither tones for high power channels in a single operation. Coherent averaging of FFT results over time is used to detect dither tones for low power channels over multiple FFT operations.

23 Claims, 5 Drawing Sheets

U.S. PATENT DOCUMENTS

| | | | |
|---|---|---|---|
| 5,513,029 A | | 4/1996 | Roberts |
| 5,959,749 A | | 9/1999 | Danagher et al. |
| 5,974,094 A | * | 10/1999 | Fines et al. .................. 375/335 |
| 6,078,412 A | * | 6/2000 | Fuse et al. ..................... 398/1 |
| 6,101,012 A | | 8/2000 | Danagher et al. |
| 2003/0067646 A1 | * | 4/2003 | Wan et al. .................. 359/124 |
| 2003/0067647 A1 | * | 4/2003 | Wan et al. .................. 359/124 |
| 2004/0062548 A1 | * | 4/2004 | Obeda et al. ................. 398/25 |
| 2004/0062549 A1 | * | 4/2004 | Obeda et al. ................. 398/30 |

OTHER PUBLICATIONS

Lyons, R., "Understanding Digital Signal Processing", published by Addison-Wesley Publishing Company, Copyright 1997, pp. 319-349.

Heisman, F., et al, "Signal Tracking and Performance Monitoring in Multi-Wavelength Optical Networks", WeB 2.2, 22nd European Conference on Optical Communication—ECOC'96, Oslo, pp. 3.47-3.50.

Hill, G.R., et al, "A Transport Network Layer Based on Optical Network Elements", Journal of Lightwave Technology, vol. 11, No. 5/6, May/Jun. 1993, pp. 667-679.

* cited by examiner

CHANNEL IDENTIFICATION IN COMMUNICATIONS NETWORKS

RELATED APPLICATION

This application is a Continuation-In-Part of U.S. patent application Ser. No. 10/067,748 to Wan et al, entitled "Channel Identification in Communications Networks", filed on 8 Feb. 2002; and claims benefit of U.S. patent application Ser. No. 09/972,991 to Wan et al, also entitled "Channel Identification in Communications Networks", filed on 10 Oct. 2001; and from Canadian Application Serial No. 2,358,382 to Wan et al, also entitled "Channel Identification in Communications Networks", filed on 5 Oct. 2001.

FIELD OF THE INVENTION

This invention relates to channel identification in communications networks or systems. The invention is generally applicable to communications networks or systems using any type of communications media, such as optical, wireless, or wired communications systems, but is particularly applicable to, and is described below in the context of, optical WDM (wavelength division multiplex) communications networks or systems.

BACKGROUND

In optical WDM communications networks or systems it has been proposed to identify each of a plurality of optical signals or channels, each at an individual optical wavelength, with a respective relatively low frequency dither tone with which the intensity or amplitude of the respective optical signal is modulated. For example, in a WDM network in which optical signals are each modulated with data at a high bit rate, for example 2.5 Gb/s or more, each optical signal may also be modulated with a respective dither tone in a relatively low frequency range, for example about 10 kHz to about 100 kHz or more. The dither tone modulation can be provided with a specific modulation depth, thereby not only providing channel identification but also power level information for the optical signal, thereby to facilitate functions such as performance monitoring and fault management in the network.

Examples of such proposals are disclosed in Hill et al., "A Transport Network Layer Based On Optical Network Elements", IEEE Journal of Lightwave Technology, Volume 11, No. 5/6, pages 667–679, May/June 1993, and in Roberts U.S. Pat. No. 5,513,029, issued Apr. 30, 1996 and entitled "Method And Apparatus For Monitoring Performance Of Optical Transmission Systems".

Heismann et al., "Signal Tracking And Performance Monitoring In Multi-Wavelength Optical Networks", 22nd European Conference on Optical Communication—ECOC' 96, pages 3.47 to 3.50, 1996 also discloses such a proposal in which a pilot tone which acts like a dither tone can further be modulated using frequency-shift keying (FSK) with an additional digital signal providing digital information, such as optical routing information. For example, this article discloses FSK modulation of tones at 10 kHz and 12 kHz each with ±500 Hz frequency excursions in accordance with respective 100 b/s digital signals.

While such proposals provide the advantage that optical channels can be identified and their power levels monitored without detection and demodulation of the optical channel itself and without serious adverse effects on the optical channels, they fail to meet increasing requirements of WDM networks in several respects.

More particularly, such proposals provide a limited number of distinguishable dither tones, each of which identifies a respective optical channel so that the WDM network can have only a similarly limited number of optical channels. In addition, detection of such tones can be very difficult. For example, an optical fiber in a WDM network may carry up to 32 optical channels within a wide optical dynamic range of for example 30 dB (a dynamic range of 60 dB for the corresponding electrical signals) or more. Detection of a dither tone for an optical channel at the lower end of this dynamic range is very difficult in the presence of possibly many other optical channels higher in this dynamic range, because the latter constitute noise for the detection process.

Further, dither tone detection can be complicated by the presence of other interference, such as interference tones that occur with a frequency spacing of about 8 kHz in the case of SONET (synchronous optical network) communications.

A need therefore exists for an improved method of and apparatus for channel identification which can facilitate robust detection of dither tones for identification of larger numbers of channels in a communications network, in particular an optical WDM network.

SUMMARY OF THE INVENTION

According to one aspect of this invention there is provided a method of identifying and detecting channels in a multiplexed communications network, comprising the steps of: modulating each channel to be identified with a respective combination of at least two continuous dither tones; and detecting the dither tones to detect said channels, the step of detecting the dither tones comprising performing a frequency analysis operation to provide amplitude and phase results for dither tone frequencies to detect dither tones of a channel having a relatively high power, and coherently averaging amplitude and phase results over a plurality of frequency analysis operations to detect dither tones of a channel having a relatively low power.

The step of modulating each channel to be identified with a respective combination of at least two continuous dither tones can comprise modulating each channel alternately, with a predetermined periodicity, with a respective one of two continuous dither tones, or modulating each channel with a respective one of at least three continuous dither tones with a cyclic repetition and a predetermined periodicity. Advantageously, the tones are modulated onto the channel in such a manner so as to have a continuous phase for the alternate tones.

Beneficially, the method of modulating the optical channels with two alternating dither tones may further comprise the steps of:

modulating the channel with another dither tone whose frequency is lower than the lowest frequency of the two dither tones; and switching frequencies between the two dither tones at instances when an amplitude of said another dither tone is close to minimal, preferably close to zero.

The method is particularly desirable and advantageous when the multiplexed communications network comprises an optical WDM network and each channel comprises an optical channel.

The step of performing a frequency analysis operation preferably comprises performing an FFT (Fast Fourier Transform) operation; this provides the advantage of enabling the amplitude and phase results of all of the dither tone frequencies to be determined in a single frequency analysis operation.

The continuous nature of the dither tones enables the coherent averaging to take place to detect the dither tones of relatively low power channels over many FFT operations, while the dither tones of relatively high power channels can be detected in a single FFT operation. The use of at least two dither tones to identify each channel greatly increases the number of channels that can be identified. The alternating or cyclic repetition of the dither tones with a predetermined periodicity ensures that each channel is modulated at any time with only one of its identifying dither tones, whereby degradation of data carried by the channel is substantially avoided without disrupting the coherent averaging.

Another aspect of the invention provides a method of identifying optical channels in an optical WDM network, comprising the steps of: continuously generating dither tones at a plurality of frequencies; and intensity modulating each of a plurality of optical channels to be identified with a respective selection of at least two of said dither tones in a cyclically repeated sequence and with a predetermined periodicity.

This method can further comprise the steps of detecting intensity modulation of at least one optical signal, detecting dither tones of the optical signal using a frequency analysis operation to provide amplitude and phase results for dither tone frequencies, and coherently averaging said results over a plurality of frequency analysis operations.

The frequency analysis operation preferably comprises an FFT (Fast Fourier Transform) operation.

The invention also provides a modulating arrangement comprising: a plurality of continuous dither tone sources; a selector for selecting at least two dither tones from said sources in a cyclically repeated sequence and with a predetermined periodicity; a modulator for modulating a channel of a multiplexed communications network with the cyclically repeated sequence of dither tones from the selector; and a feedback loop for maintaining a predetermined modulation depth of the channel by the modulator.

In particular for an optical WDM network the modulator preferably comprises an optical modulator for intensity modulating an optical channel of the network.

Another aspect of the invention provides apparatus comprising a plurality of such modulating arrangements, each arranged to modulate a respective one of a plurality of optical channels having respective wavelengths with a respective cyclically repeated sequence of dither tones thereby to provide each optical channel with a respective channel identity, and an optical multiplexer for multiplexing together the plurality of optical channels including their respective channel identities.

The invention further provides a detection arrangement for use in a multiplexed communications network including a modulating arrangement as recited above, the detection arrangement comprising a detector for detecting the modulation by said modulator, an FFT (Fast Fourier Transform) processor for providing FFT results for dither tone frequencies, and an arrangement for coherently averaging the FFT results over a plurality of FFT operations.

BRIEF DESCRIPTION OF THE DRAWINGS

The invention will be further understood from the following description by way of example with reference to the accompanying drawings, in which.

DETAILED DESCRIPTION

As indicated initially above, embodiments of the invention are described below in the context of an optical WDM network, but the invention is also generally applicable to, and the described embodiments of the invention may be adapted for operation in, other types of communications network.

As described above, one disadvantage of known channel identification proposals is that each optical channel is identified by a respective dither tone, and there is a limited number of dither tone frequencies and hence a similarly limited number of optical channels in the WDM network. While this number can be increased by increasing a frequency range over which the dither tones extend and/or by decreasing a frequency spacing of the dither tones within this range, such steps involve other disadvantages, such as an increased potential for interference with data signals and/or increased difficulty in distinguishing the dither tones from one another.

In embodiments of this invention, this disadvantage is greatly reduced or eliminated by using a combination of two or more dither tones for identification of each optical channel. For example, an optical WDM network may provide 1600 dither tones in a frequency range from about 48 kHz to about 64 kHz with a constant separation or frequency spacing of 10 Hz between adjacent dither tones. A combination of, for example, two such tones is used to identify each optical channel, so that the number of channels which can be identified is increased, from 1600 using one such tone to identify each channel as in the known proposals, to the order of 2.5 million.

A combination of a greater number of dither tones, for example three or more, can alternatively be used to identify individually an even greater number of optical channels, so that the WDM network can have a virtually unlimited number of individually identifiable optical channels. Similarly, a combination of a greater number of dither tones can be used in a redundant manner to increase reliability or robustness of the channel identification, even in the case of low optical power levels and in the presence of interference. For example, each optical channel can be identified by a respective combination of three dither tones, the channel being detected by detection of at least any two of the three dither tones.

For simplicity in the following description it is assumed that each optical channel is identified by a respective combination of two dither tones. The nature of the combination of the dither tones is discussed further below.

Also, in order to increase the robustness of the channel identification in the presence of interference, some constraints may be placed on the particular selections of dither tones used to identify each optical channel. For example, with SONET interference tones occurring with a frequency spacing of about 8 kHz as described above, the dither tones selected for each channel identification may be selected to avoid spacings of about 8 kHz between them, so that at worst only one of the two (or more) dither tones is subject to these interference tones.

The combination of the dither tones for each channel identification is preferably an alternation of the two dither tones (or a cyclic repetition for a sequence of more than two dither tones), each dither tone being modulated onto the respective optical channel in turn for a predetermined period as further described below. Thus the dither tones are alternately (or cyclically) switched to modulate and thereby identify the respective optical channel.

Although such switching of the dither tones is preferred as discussed further below, other ways of combining the dither tones are possible. For example, the dither tones for identifying each channel may be summed and the respective optical channel modulated with the resulting summed signal. However, this is not preferred because this composite modulation undesirably produces greater closure of the "eye" for detection of the high speed data signal carried by the optical channel. Such eye closure is further increased using a sum of more than two dither tones for each channel identification.

It can be appreciated that, as in the FSK modulation of a single tone channel identifier as described in the article by Heismann et al. referred to above, the two or more dither tones used for channel identification as described here can be further extended for additionally carrying low speed data in various ways.

As discussed above, a significant difficulty with known proposals for channel identification using dither tones arises from a wide dynamic range of optical signals which can occur in an optical WDM network. This is further described below by way of a very simple example represented by FIGS. 1 and 2.

Figure 1:
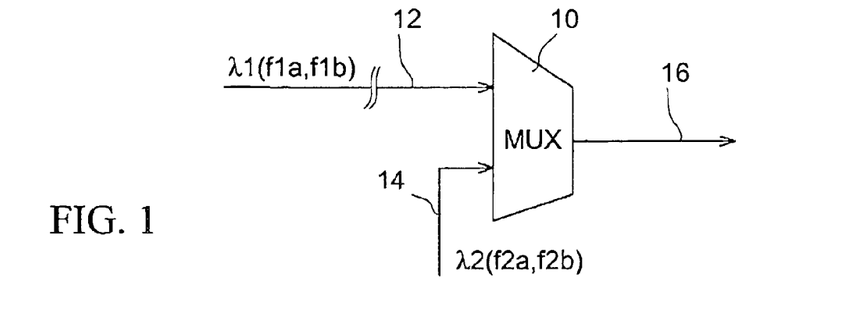
FIG. 1 illustrates an optical multiplexer arrangement with reference to which a problem addressed by an embodiment of the invention is explained.

Referring to FIG. 1, an optical multiplexer 10 is illustrated as being supplied with two optical signals on optical paths 12 and 14, and producing a multiplexed optical signal on an optical path 16. The optical signal on the path 12 is assumed to comprise an optical channel having a wavelength $\lambda 1$, this channel being identified by two alternating dither tones f1$a$ and f1$b$ in the manner described above. The optical signal on the path 14 is assumed to comprise an optical channel having a wavelength $\lambda 2$, this channel being identified by two alternating dither tones f2$a$ and f2$b$ also in the manner described above.

Figure 2:
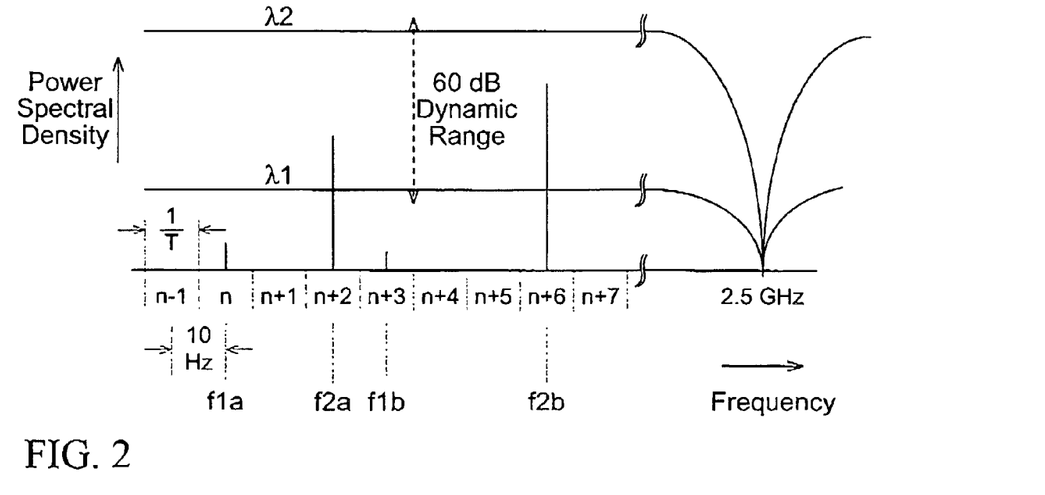
FIG. 2 diagrammatically illustrates possible power spectral densities of signals of the arrangement of FIG. 1.

FIG. 2 represents part of a graph of power spectral density (PSD) versus frequency, for signals of the optical channels at the wavelengths $\lambda 1$ and $\lambda 2$; FIG. 2 in particular illustrates a small part of the frequency range which includes the dither tones f1$a$, f1$b$, f2$a$, and f2$b$ which are assumed for convenience of illustration to be close together. As dither tone detection is typically performed using an FFT (Fast Fourier Transform) process which produces total energy or power results for respective frequency bins or adjacent frequency ranges, the frequency axis in FIG. 2 is labelled to show such frequency bins numbered n−1 to n+7 where n is an integer. For example, FIG. 2 illustrates these frequency bins as being centered at frequencies 10 Hz apart, corresponding to a constant frequency spacing of adjacent dither tones of 10 Hz as stated above by way of example, the FFT process or operation being performed over a period T which is the inverse of the frequency bin periodicity, so that in this case (1/T)=10 Hz.

As illustrated in FIG. 2, the dither tones f1$a$ and f1$b$ are at the centres of the frequency bins n and n+3 respectively, and the dither tones f2$a$ and f2$b$ are at the centres of the frequency bins n+2 and n+6 respectively.

The high speed data carried by the optical channels is typically NRZ (non-return to zero) data having a sinc ((sin x)/x) frequency characteristic, for which the PSDs of the signals for the optical channels having the wavelengths $\lambda 1$ and $\lambda 2$ are also illustrated in FIG. 2. The optical signals can have relative optical powers which may be anywhere within a wide dynamic range, typically a range of about 30 dB or more, corresponding to (electrical) PSDs within a range of about 60 dB or more as represented in FIG. 2 by a vertical dashed line. Within the respective frequency bins of the FFT process, the high speed data signal components of the optical channels constitute noise which detracts from the dither tone detection.

By way of example, it is assumed that the optical channel at the wavelength $\lambda 1$ has a relative optical power near the low end of the dynamic range (for example this optical channel may have traversed a large number of attenuating optical components), and that the optical channel at the wavelength $\lambda 2$ has a relative optical power near the high end of the dynamic range (for example it may have been supplied from a local modulated laser source). Over the range of the frequency bins the corresponding high speed data PSDs of these channels are substantially constant and are represented by horizontal lines labelled $\lambda 1$ and $\lambda 2$ respectively in FIG. 2.

In comparison, the PSDs of the dither tones f1$a$ and f1$b$ for the relatively weak optical channel at the wavelength $\lambda 1$ are very small, as shown in FIG. 2, so that these dither tones can be very difficult to detect. It is observed that, as shown in FIG. 2, the PSDs of the dither tones f1$a$ and f1$b$ for the optical channel at the wavelength $\lambda 1$, and likewise the greater PSDs of the dither tones f2$a$ and f2$b$ for the optical channel at the wavelength $\lambda 2$, are not generally equal. This is because in the embodiments described above there is no synchronization between the alternating periods for which the dither tones modulate the respective optical channels, so that each dither tone of each channel can be present during an arbitrary part of the FFT period T.

It can be appreciated that the difficult problem of detecting the dither tones, e.g. f1$a$ and f1$b$, of a weak optical channel is exacerbated in the event, as may be typical, that the optical path 16 carries multiple optical channels with high relative optical powers. For example, in an optical WDM network each such optical path may carry up to 32 optical channels.

One way in which this problem can potentially be reduced is to decrease the width of each frequency bin in the FFT process, thereby reducing the noise component within each frequency bin due to the optical channels. This corresponds to an increase in the period T of the FFT process and the number of frequency bins within a given frequency range, thereby considerably increasing computational and memory requirements for the FFT process, and also increasing a delay for detection of the dither tones. For the wide dynamic range indicated above, the period T may need to be of the order of 100 seconds, and these requirements and the corresponding delay are increased to such an extent that this approach becomes impractical.

It can be appreciated that this also necessitates a very precise generation of each dither tone. For example, a period T of 100 seconds corresponds to a frequency bin width of 0.01 Hz, requiring a substantially better precision than this for generation of each dither tone.

Although these difficulties are very significant for the extreme condition of optical signals being at opposite ends of the wide dynamic range as illustrated in FIG. 2, it can be realised that in most situations such extreme conditions will not apply. For optical signals all of which are within a smaller dynamic range of for example about 20 dB, it can be practical to detect the dither tones for all of the optical channels using an FFT process with a period T of for example 1 second and frequency bins of width 1 Hz, considerably reducing the FFT computational and memory requirements and the detection delay in such more usual conditions.

In view of these considerations, in an embodiment of the invention as described below an FFT process is used with a period T, for example 1 second, which is sufficiently short to be practical in terms of computation, memory, and delay requirements and which in many cases of optical channels having typical optical power levels is sufficient to permit their dither tones to be detected within this FFT period, i.e. in a single FFT operation. This FFT process is supplemented by coherent averaging of the FFT results over longer periods, i.e. over a plurality, possibly many, FFT operations, enabling dither tones of channels at lower relative powers also to be detected even where different ones of the optical channels have powers at both extremes of the dynamic range, extending over the maximum optical dynamic range of for example 30 dB.

To permit this coherent averaging, the dither tones are continuously generated, and the alternating switching between the two dither tones identifying each optical channel has precisely controlled periods, so that a dither tone detector can determine precisely a phase relationship between successive bursts of each dither tone, as further described below. In addition, the dither tones are generated with a desired accuracy, conveniently all being derived from a single, high frequency, stable oscillator.

Figure 3:
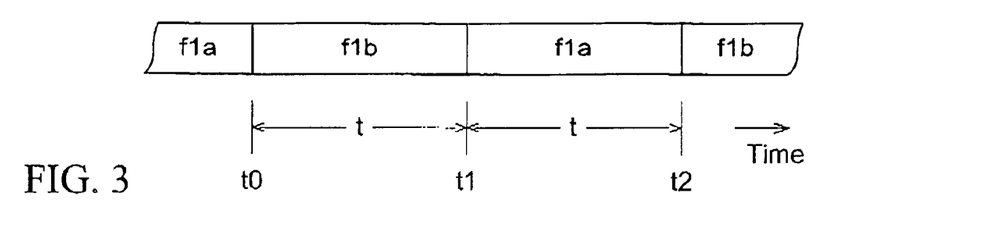
FIG. 3 illustrates successive bursts of dither tones providing a channel identification.

By way of example, it is assumed that a duration t of a dither tone switched alternately for modulation and hence identification of a respective optical channel is the same for all dither tones and for all optical channels. Conveniently, this duration t may be of the order of 1 second. FIG. 3 illustrates consequent successive bursts of the dither tones f1a and f1b which are used for modulation and identification of the optical channel having the wavelength λ1 as described above.

Referring to FIG. 3, the respective optical channel having the wavelength λ1 is modulated alternately as described above with the dither tones f1a and f1b. At a switching time t0, there is a switch of the modulating dither tone from f1a to f1b. Subsequently, at a switching time t1 there is a switch of the modulating dither tone from f1b back to f1a, at a switching time t2 there is a switch of the modulating dither tone from f1a back to f1b, and so on. Each dither tone burst has a duration t, i.e. the switching times t0, t1, t2, and so on occur periodically with the time spacing t.

Although there may be a phase discontinuity between the modulating dither tones at the respective switching times, the facts that these switching times occur with the periodicity t and each dither tone is produced continuously mean that there is a precisely determinable phase relationship between successive bursts of each dither tone. Thus there is a phase difference of $2\pi tf$ between the end of each burst of a dither tone and the start of the next burst of the same dither tone after an interval t, where f is the frequency of the respective dither tone. Thus for the dither tone f1a this phase difference, between the switching times t0 and t1, is $2\pi t(f1a)$, and for the dither tone f1b this phase difference, between the switching times t1 and t2, is $2\pi t(f1b)$.

Knowing the periodicity t, each dither tone detector can accordingly determine this phase difference for each dither tone, and use the determined phase difference for coherent averaging of the FFT results for the respective dither tone over a plurality, possibly a large number, of FFT processing periods or FFT operations. The noise energy due to the optical signals over such periods is not similarly coherent, so that the coherent averaging, which is an accumulation of FFT results for each respective frequency bin in accordance with amplitude and phase over time, enhances the detection of the respective dither tone relative to this noise.

More particularly, for detecting each dither tone, each FFT operation produces a phase and amplitude result (for example represented by a complex number) for the respective frequency bin. For coherent averaging over successive FFT operations, a current result or average can be phase shifted in accordance with the phase difference between successive bursts of this dither tone as discussed above, and the result for the next FFT operation for the same frequency bin added in accordance with its phase and amplitude (i.e. a vector addition). This accumulation can be carried out in accordance with any desired averaging process, for example using windowing or weighting of the FFT results. Over a desired averaging period, this coherent averaging distinguishes between a dither tone of a weak optical channel and noise.

Although an FFT is referred to above and is preferred because it enables phase and amplitude results to be produced for all of the dither tone frequencies for each FFT period T, it can be appreciated that other forms of frequency analysis may be used to produce phase and amplitude results for the respective dither tone frequencies, either individually for different frequency analysis operation periods (for example, using a Discrete Fourier Transform process) or collectively within a single period.

Figure 4:
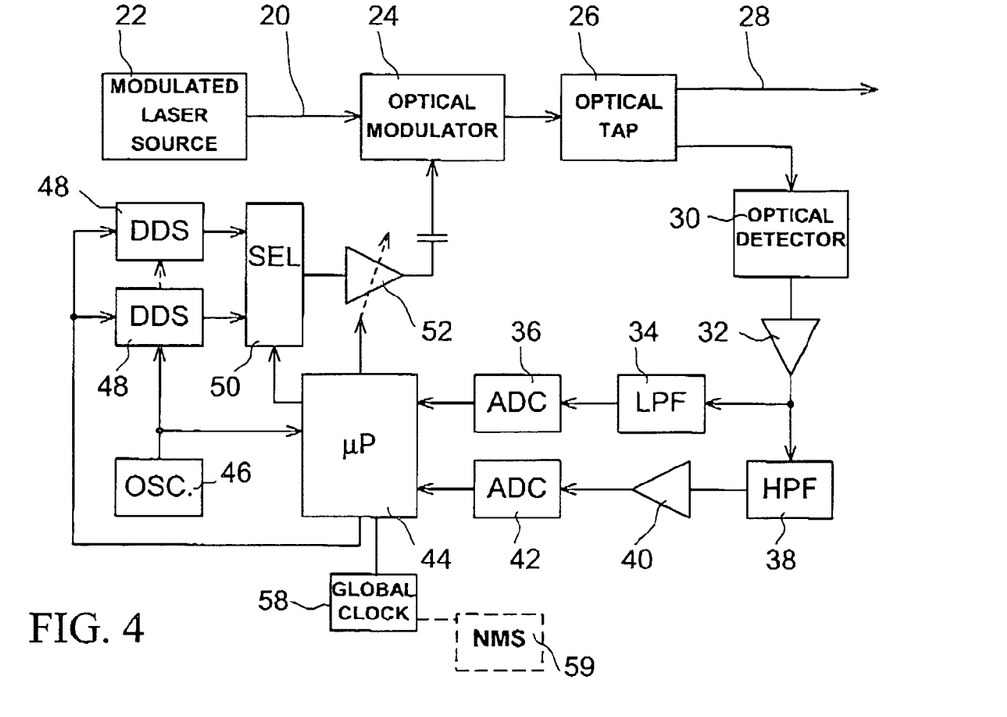
FIG. 4 illustrates one form of dither tone generator and modulating arrangement in accordance with an embodiment of the invention.

FIG. 4 illustrates one form of dither tone generator and modulating arrangement, which can be used in an embodiment of the invention. Referring to FIG. 4, an optical channel is provided on an optical fiber or path 20 from a modulated laser source 22, and is supplied via an optical modulator 24 and an optical tap 26 to an ongoing optical path 28. The source 22 provides the optical channel at a desired optical wavelength and modulated with data to be carried by the optical channel, typically at a high bit rate of for example 2.5 Gb/s. The data modulation can alternatively be carried out separately from the source 22, for example on the optical path 20, or using the optical modulator 24, or on the optical path 28 after the optical tap 26, the optical modulator 24 in the latter case modulating an optical carrier for the optical channel. In any event, the optical modulator 24 provides intensity modulation of the optical channel for channel identification as described below.

The optical tap 26 supplies a small portion, e.g. 5%, of the optical output of the modulator 24 to an optical detector 30, whose electrical output is amplified by an AGC (automatic gain controlled) amplifier 32. An output of the amplifier 32 is supplied via a low pass filter (LPF) 34 to an analog-to-digital converter (ADC) 36, and via a band pass or high pass filter (HPF) 38 and an amplifier 40 to an ADC 42. The ADCs 36 and 42 produce digital signals, which are supplied to a digital signal processor or microprocessor (μP) 44.

An oscillator 46 provides a stable source of a signal, for example at a frequency of 50 MHz, which is supplied to the microprocessor 44 and to each of a plurality of direct digital synthesizers (DDSs) or other programmable frequency sources 48. Each DDS 48 is arranged to produce, under programmed control of the microprocessor 44, a respective one of the dither tones on a respective input to a selector 50. An output of the selector 50 is coupled via a controlled gain amplifier 52 and a capacitive coupling to a control input of the optical modulator 24. The selector 50 and the gain of the amplifier 52 are controlled by the microprocessor 44.

In operation, each DDS 48 is arranged to produce continuously a respective one of the dither tones to be used for identification of the respective optical channel; for example the dither tones f1a and f1b for the optical channel λ1 as described above can be produced each by a respective one of two DDSs 48 at the source of this optical channel. The selector 50 is controlled by the microprocessor 44 to alternately select these dither tones with the periodicity t as described above, whereby these tones are modulated onto the optical channel by the optical modulator 24. In the case of more than two dither tones used for channel identification, there is a correspondingly increased number of DDSs 48 and selector inputs, and the selector 50 is controlled by the microprocessor 44 to select the respective dither tones in a cyclically repeating periodic sequence.

The LPF 34 and ADC 36 provide a DC feedback path to the microprocessor 44, and the HPF 34, amplifier 40, and ADC 42 provide a feedback path to the microprocessor 44 for the frequency band of the dither tones, in accordance with which the microprocessor 44 controls the gain of the amplifier 52 to maintain a desired constant depth of modulation by the optical modulator 24. For example, the modulation depth may be about 4%. The use of a constant modulation depth for channel identification facilitates determining optical power levels in the WDM network in known manner.

Although FIG. 4 represents an arrangement for only one optical channel, it can be appreciated that the same arrangement can be provided for each optical channel, and that parts of these respective arrangements may be common for multiple optical channels. For example, it can be appreciated that the ADCs 36 and 42 and the microprocessor 44 can be multiplexed for operation for a plurality of optical channels, the oscillator 46 can be used in common for all of the optical channels, and only as many DDSs 48 are required as the number of dither tones used for identifying the respective optical channels.

In this respect, it is observed that a particularly convenient arrangement can be provided by providing all of the components of FIG. 4, except the modulated laser source 22, for each of a plurality of optical channels which are initially multiplexed by an optical multiplexer (similar to the multiplexer 10 of FIG. 1) at the inputs of this multiplexer.

This facilitates implementation of the arrangement of FIG. 4 with the multiplexed operation as described above for the plurality of optical channels, while enabling the optical channels to be supplied from arbitrary modulated laser sources such as the source 22. More generally, it can be appreciated that the dither tones can be applied to any optical channel anywhere between its source and its multiplexing with one or more other optical channels.

Figure 5:
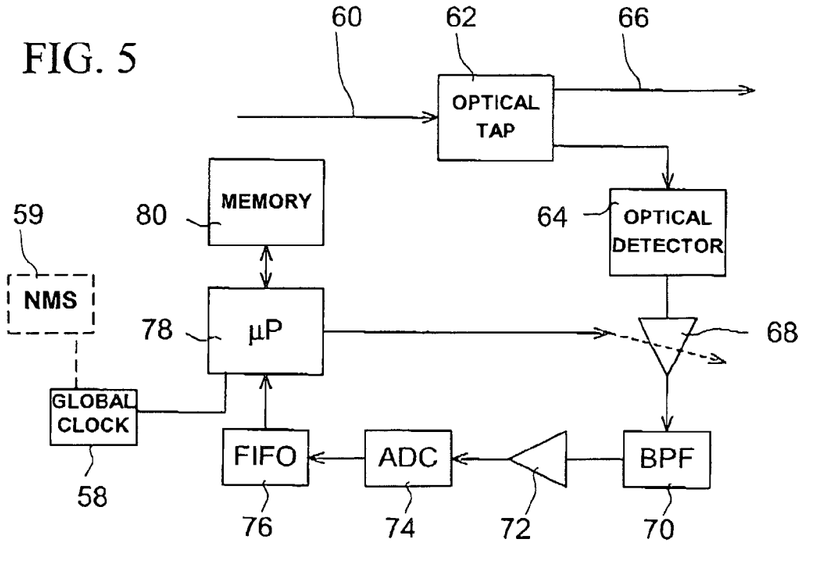
FIG. 5 illustrates one form of dither tone detection arrangement in accordance with an embodiment of the invention.

FIG. 5 illustrates a corresponding dither tone detection arrangement, which may be used at any desired point in the optical WDM network for identifying an optical channel on an optical fiber or path 60 by detecting the dither tones.

Referring to FIG. 5, an optical tap 62 supplies a small portion, e.g. 5%, of an optical signal on the path 60 to an optical detector 64, and supplies most of the optical signal power to an ongoing optical path 66. An electrical output of the optical detector 64 is amplified by a controlled gain amplifier 68, an output of which is supplied via a band pass filter (BPF) 70 and an amplifier 72 to an ADC 74. The BPF 70 has a pass band including the dither tone frequency range. The ADC 74 produces a digital signal which represents detected dither tones and is supplied via a FIFO (first-in, first-out store) 76 to a digital signal processor or microprocessor 78. The microprocessor 78, which has an associated memory 80, controls the gain of the amplifier 68 in accordance with the power of the optical signal on the path 60.

The microprocessor 78 operates in known manner to perform FFT processing of the digital signals provided by the ADC 74, using the memory 80 for this FFT processing, in respective FFT periods T to detect any dither tone modulation of the optical signal on the optical path 60, with the FIFO 76 ensuring that data is not lost during FFT processing by the microprocessor 78. As discussed above, this determines the respective dither tones, and hence the optical channel identification, in one FFT operation in many instances of typical optical signal power levels. For ensuring detection of dither tones for relatively low power optical channels even in the presence of one or more relatively high power optical channels on the path 60, without increasing the FFT period T, coherent averaging of the FFT results is carried out over a plurality, possibly a large number, of successive FFT periods T as described above.

As indicated above, there is no requirement for synchronization between, for example, the operation of the selector 50 in the dither tone generation arrangement of FIG. 4 and the FFT periods of the microprocessor 78 in the detection arrangement of FIG. 5. The continuous generation of each dither tone ensures that, regardless of the particular timing of the selection of this dither tone by a selector such as the selector 50, and regardless of the particular relative timing of the FFT periods T used in a detection arrangement, the coherent averaging over a plurality of such FFT periods will gradually result in accumulated results properly representing any dither tones which are present. As indicated above, such coherent averaging comprises an accumulation of the FFT frequency bin results, or amplitudes in accordance with their respective phase differences for successive FFT periods, these phase differences being determined by the microprocessor 78 of the detection arrangement from the dither tone frequencies and the known period "t".

As indicated above, it is conceivable to replace the alternating dither tones, as described above for identification of each optical channel, by some other combination, such as a summation, of these dither tones, for example by replacing the selector 50 of FIG. 4 by a signal combiner or summer. However, as also indicated above, this is not preferred because it results in relatively increased modulation depth of each optical channel, with corresponding eye closure for detection of the high speed data signal carried by the optical channel.

Figure 6A:
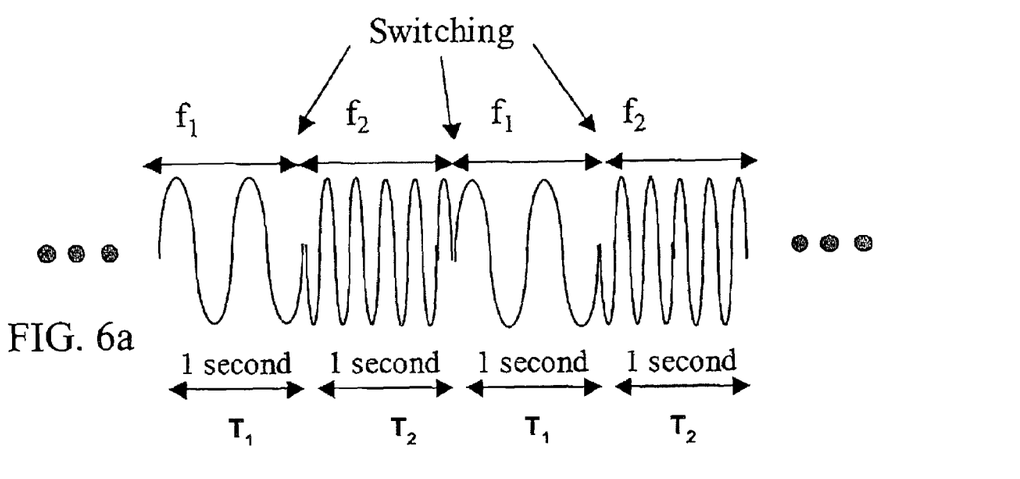
FIG. 6a illustrates synchronized alternating of dither tones in a network.

In another embodiment of the invention, an additional feature of synchronizing switching of dither tones respectively generated and processed by encoding and decoding arrangements at all nodes in a network is provided, i.e. all encoding/decoding arrangements are using the same clock (e.g. global clock), and all of them provide switching/ alternating of dither tones at the same time and during same time interval. It means that the steps of modulating and detecting the respective dither tones are synchronized so that time intervals of modulating and detecting the respective dither tone have same duration and start at the instant of switching dither tone frequencies. This situation is illustrated for two alternating tones f1 and f2 in FIG. 6a, and a global clock 58 is shown in dashed line in FIGS. 4 and 5. To have global timing in the network, it is possible to run, e.g., a Network Time Protocol (NTP) on a controlled network. Then a network manager block 59 running the network management software (NMS) sends the global/network timing information to the global clock 58 at each node. Respective synchronization signals are then sent to the microprocessors 44 and 78 at the encoding and decoding arrangements to synchronize both encoding and decoding processes in the network.

Figure 6B:
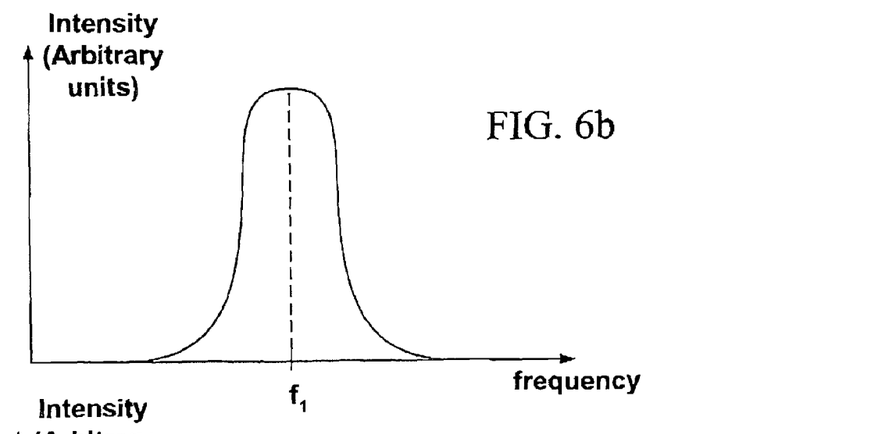
FIG. 6b and FIG. 6c respectively illustrate FFT spectra for synchronized and unsynchronized switching of dither tones in a network.
Figure 6C:
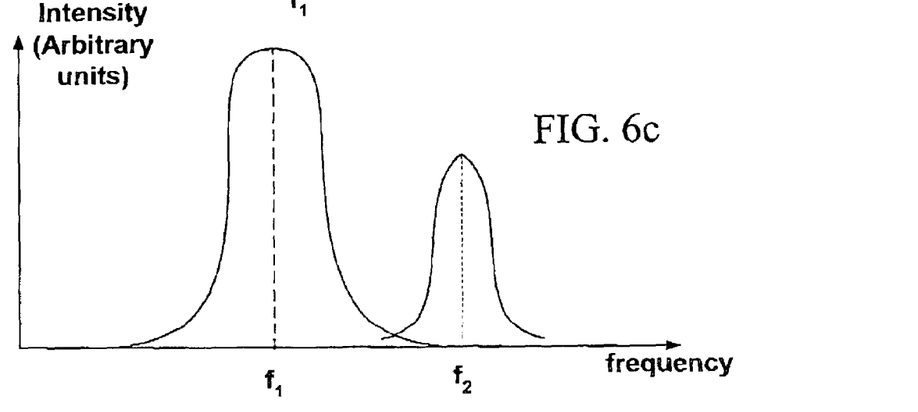

Such an encoding/decoding scheme using global synchronization has the following advantages. It allows to detect dither tones easier and with higher signal to noise ratio (about 3 dB higher) as only one of the alternating dither tones appears in an FFT spectrum at a time (FIG. 6b) instead of two tones in unsynchronized schemes (FIG. 6c). Because there is no frequency change in an FFT spectrum at a time, leakage/interference between the two (or more) dither tones is now avoided. It means that spectral range available for the assignment of dither tones can accommodate more tones that will not interfere with each other. As a result, more dither tone frequencies are available for assignment to optical signals, and the whole spectral range is used more efficiently.

Figure 7:
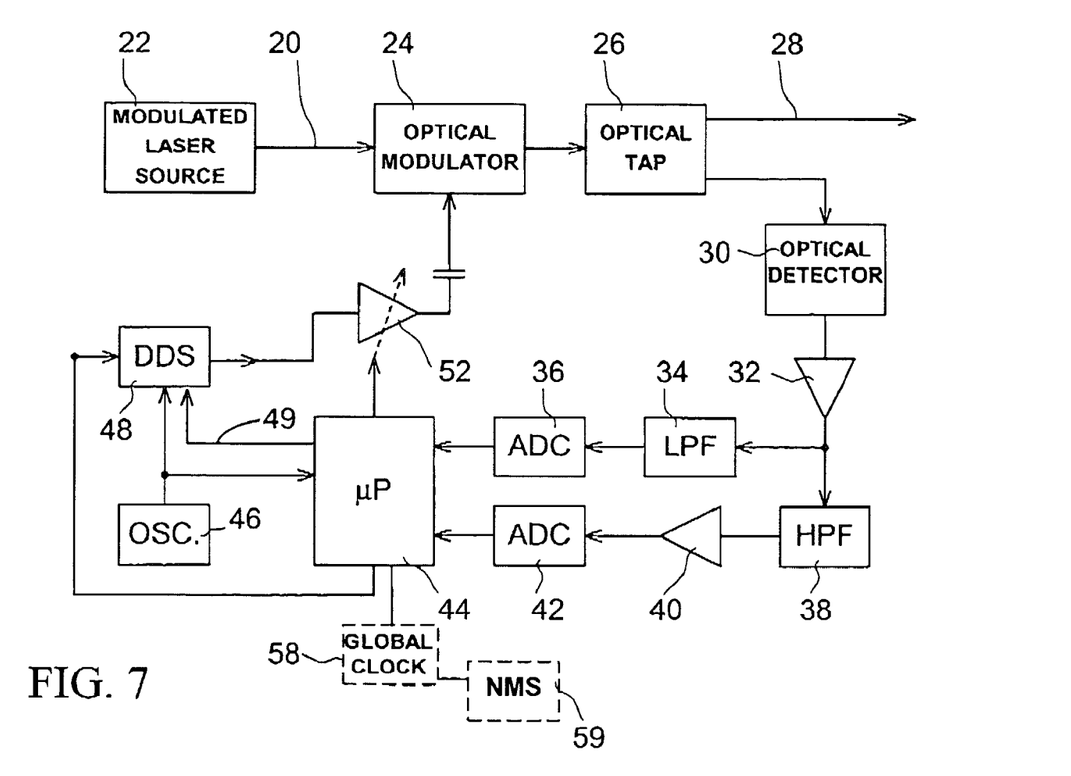
FIG. 7 illustrates the dither tone generator and modulating arrangement in accordance with a modification to the embodiments of the invention.

In yet another modification to the embodiments of the invention, the encoding of dither tones onto the optical channel can be made by the dither tone generator and modulating arrangement which uses one DDS only. Such an arrangement is illustrated by FIG. 7. It is similar to the arrangement of FIG. 4 except for the selector 50 and one of the two DDSs 48 being removed from the arrangement (retaining only one DDS), and a switching control 49 from the μP 44 going directly to the retained DDS 48 (instead of going to the selector 50 in FIG. 4). The rest of the dither tone generator and modulating arrangement is identical to that shown in FIG. 4, where the same elements are designated by the same reference numerals on both FIGS. 4 and 7.

In the modulating arrangement of FIG. 7 the DDS is directly controlled by the μP 44, i.e., it is controlled when to switch between selected dither tones. By having just one DDS 48, the phase continuity between the two dither tones of different frequencies is provided opposed to the arrangement of two DDSs which had a shift (jump) in phases between their respective tones. It is known that sudden phase shift may result in unwanted high frequency noise (leakage) at DSP and broadening of the dither tones themselves. Thus, by using just one DDS 48 and providing phase continuity of dither tones, this problem is reduced or eliminated.

Figure 8:
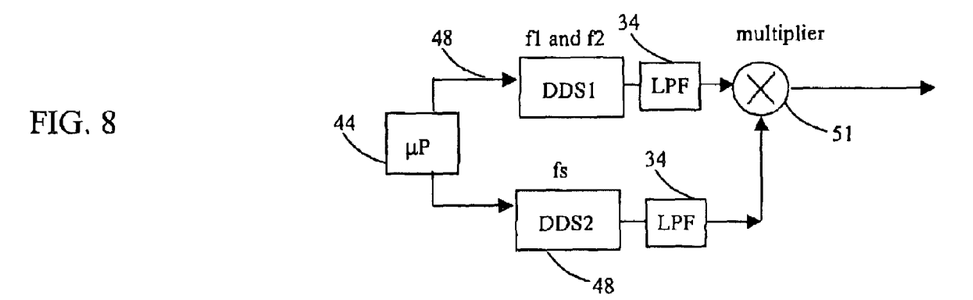
FIG. 8 illustrates a hardware windowing implementation.
Figure 9A:
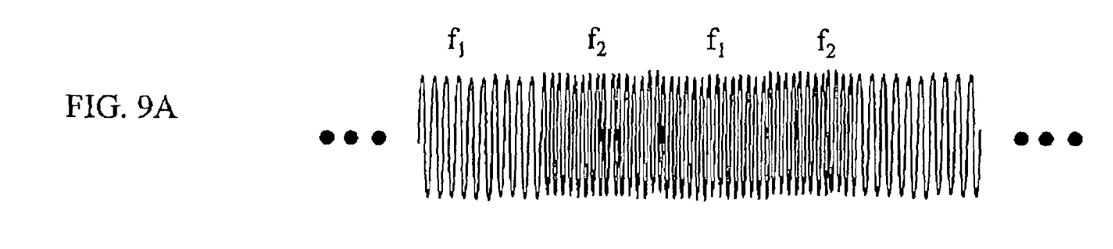
FIG. 9A shows dither tones generated by DDS1 of FIG. 8.
Figure 9B:
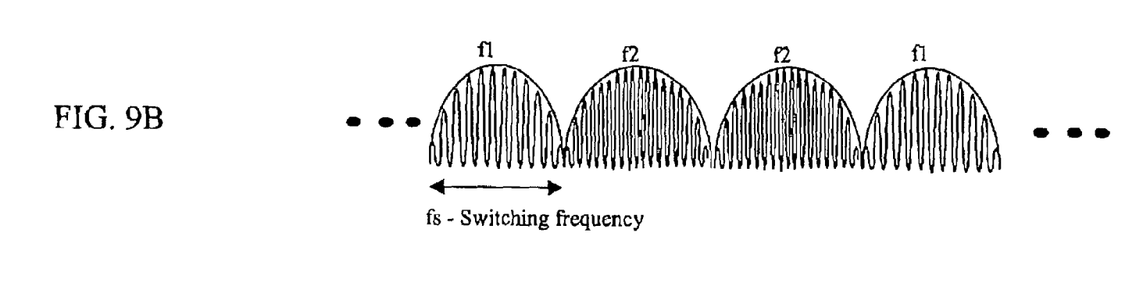
FIG. 9B shows dither tones with hardware windowing technique being applied.

In one more modification to the embodiments of the invention, the encoding of dither tones onto the optical channel is performed by using a dither tone generator and modulating arrangement having two DDSs, where a technique of "hardware windowing" has been implemented. Means for performing hardware windowing is illustrated in FIG. 8. It includes the microprocessor μP44, which provides control of DDS1 and DDS2 (designated as 48), the DDS1 and DDS2 being further connected to a multiplier 51 via corresponding LPFs 34. DDS1 is to generate two alternate dither tones having frequencies f1 and f2 respectively as illustrated in FIG. 9A. For example, f1 and f2 may be chosen as f1=50 000 Hz and f2=50 010 Hz. DDS2 is to generate a very slow frequency tone fs (e.g., 0.25 Hz), which is mixed with the f1 and f2 tones from DDS1 to result in the dither tone profile shown in FIG. 9B. The μP 44 controls the switching between frequencies f1 and f2 in such a manner that the frequency switching occurs right at the minimum point of tone fs, i.e., when its amplitude is minimal and close to zero (see FIG. 9B). As a result, the requirement for the phase continuity between f1 and f2 tones may be substantially reduced or eliminated. Because the frequency switching takes place when the amplitude of the dither signal is close to zero, the phase shift (if there is any) does not contribute to the leakage at DSP between different FFT bins, and thus, performance of the modulating arrangement is substantially improved.

Although embodiments of the invention have been described with the use of Fast Fourier Transform (FFT), it is contemplated that other known types of discrete transforms can also be used in the step of detecting and processing dither tones. Examples of such transforms are Discrete Cosine Transform (CDCT), Discrete Sinus Transform (DST), Inverse Discrete Cosine Transform (IDCT), Inverse Discrete Sinus Transform (IDST), Fast Walsh Transform (FWT), Fast Hadamard Transform (FHT).

In addition, although the description above relates to an optical WDM network in which optical channels are identified by having their intensity modulated with a combination of a plurality of dither tones, it can be appreciated that similar principles can be applied to identifying and detecting multiple channels in networks and systems using other types of communications media and modulation methods.

Thus although particular embodiments of the invention are described above, it can be appreciated that these and numerous other modifications, variations, and adaptations may be made without departing from the scope of the invention as defined in the claims.

The invention claimed is:

1. A method of identifying and detecting channels in a multiplexed communications network, comprising the steps of:
   modulating each channel to be identified alternately, with a predetermined periodicity, with a respective one of two continuous dither tones in such a manner that the phase of the alternate dither tones is substantially continuous; and
   detecting the dither tones to detect said channels, the step of detecting the dither tones comprising performing a frequency analysis operation to detect dither tones of a channel having a relatively high power, and performing coherent averaging of the frequency analysis results from a plurality of frequency analysis operations performed over a plurality of respective time periods to detect dither tones of a channel having a relatively low power.

2. A method as described in claim 1, wherein the step of performing the frequency analysis operation comprises performing a discrete transform operation.

3. A method as described in claim 2, wherein the step of performing the discrete transform operation comprises performing a Fast Fourier Transform (FFT) operation.

4. A method as described in claim 2, wherein the step of performing the discrete transform comprises performing one or more of the following transforms: Discrete Cosine Transform (CDCT), Discrete Sinus Transform (DST), Inverse Discrete Cosine Transform (IDCT), Inverse Discrete Sinus Transform (IDST), Fast Walsh Transform (FWT), and Fast Hadamard Transform (FHT).

5. A method as claimed in claim 2 wherein the multiplexed communications network comprises an optical WDM network and each channel comprises an optical channel.

6. A method as described in claim 1, wherein the steps of modulating and detecting the respective dither tones are synchronized.

7. A method as described in claim 1, wherein the steps of modulating and detecting the respective dither tones are synchronized by using a global clock in the network so that the time intervals of modulating and detecting the respective dither tones have same duration and start at the instant of switching dither tone frequencies.

8. A method as claimed in claim 1 wherein the multiplexed communications network comprises an optical WDM network and each channel comprises an optical channel.

9. A method as claimed in claim 1, further comprising the steps of:
modulating each channel with another dither tone whose frequency is lower than the lowest frequency of the two alternate dither tones; and
switching frequencies between the two dither tones at instances when an amplitude of said another dither tone is close to minimal.

10. A method as claimed in claim 9, wherein the step of switching comprises switching frequencies between the two dither tones at instances when the amplitude if said another dither tone is close to zero.

11. A method of identifying optical channels in an optical WDM network, comprising the steps of:
continuously generating dither tones at a plurality of frequencies; and
intensity modulating each of a plurality of optical channels to be identified alternately, with a predetermined periodicity, with a respective one of a respective selection of two of the dither tones in such a manner that the phase of the alternate dither tones is substantially continuous.

12. A method as claimed in claim 11 wherein each optical channel to be identified is intensity modulated.

13. A method as claimed in claim 12 and further comprising the steps of detecting intensity modulation of at least one optical signal, detecting dither tones of the optical signal using a frequency analysis operation, and performing coherent averaging of results of the frequency analysis operation over a plurality of frequency analysis operations.

14. A method as claimed in claim 13 wherein the frequency analysis operation comprises an FFT (Fast Fourier Transform) operation.

15. A method as claimed in claim 11 and further comprising the step of detecting intensity modulation of at least one optical signal, detecting dither tones of the optical signal using a frequency analysis operation, and coherently averaging said results over a plurality of frequency analysis operations.

16. A method as claimed in claim 15 wherein the frequency analysis operation comprises an FFT (Fast Fourier Transform) operation.

17. A modulating arrangement comprising:
a continuous dither tone source;
a processor for instructing the continuous dither tone source to generate alternately, with a predetermined periodicity, two continuous dither tones in such a manner that the phase of the alternate dither tones is substantially continuous;
a modulator for modulating a channel of a multiplexed communications network with the alternate dither tones; and
a feedback loop for maintaining a predetermined modulation depth of the channel by the modulator.

18. A modulating arrangement as claimed in claim 17, further comprising a link to a global clock so that to provide alternate switching of the dither tones at predetermined instances of time.

19. A modulating arrangement as claimed in claim 17 wherein the multiplexed communications network comprises an optical WDM network and the modulator comprises an optical modulator for intensity modulating an optical channel of the optical WDM network.

20. Apparatus comprising a plurality of modulating arrangements as claimed in claim 19, each arranged to modulate a respective one of a plurality of optical channels having respective wavelengths with a respective cyclically repeated sequence of dither tones thereby to provide each optical channel with a respective channel identity, and an optical multiplexer for multiplexing together the plurality of optical channels including their respective channel identities.

21. A detection arrangement for use in a multiplexed communications network including a modulating arrangement as claimed in claim 17, the detection arrangement comprising a detector for detecting the modulation by said modulator, an FFT (Fast Fourier Transform) processor for providing FFT results for dither tone frequencies, and an arrangement for coherently averaging the FFT results over a plurality of FFT operations.

22. A detection arrangement as claimed in claim 21 wherein the detector comprises an optical detector for detecting intensity modulation of an optical signal in an optical WDM network.

23. A detection arrangement as claimed in claim 21 wherein the modulating and detecting arrangements are synchronized by using same clock so that the time intervals of modulating and detecting the respective dither tones have same duration and start at the instant of switching dither tone frequencies.

* * * * *

UNITED STATES PATENT AND TRADEMARK OFFICE
CERTIFICATE OF CORRECTION

PATENT NO. : 7,155,122 B2  
APPLICATION NO. : 10/263959  
DATED : December 26, 2006  
INVENTOR(S) : Ping Wai Wan et al.

It is certified that error appears in the above-identified patent and that said Letters Patent is hereby corrected as shown below:

Column 13, line 28, "if said" is corrected to read as -- of said --.

Signed and Sealed this

Third Day of August, 2010

David J. Kappos  
*Director of the United States Patent and Trademark Office*